Figure 1:
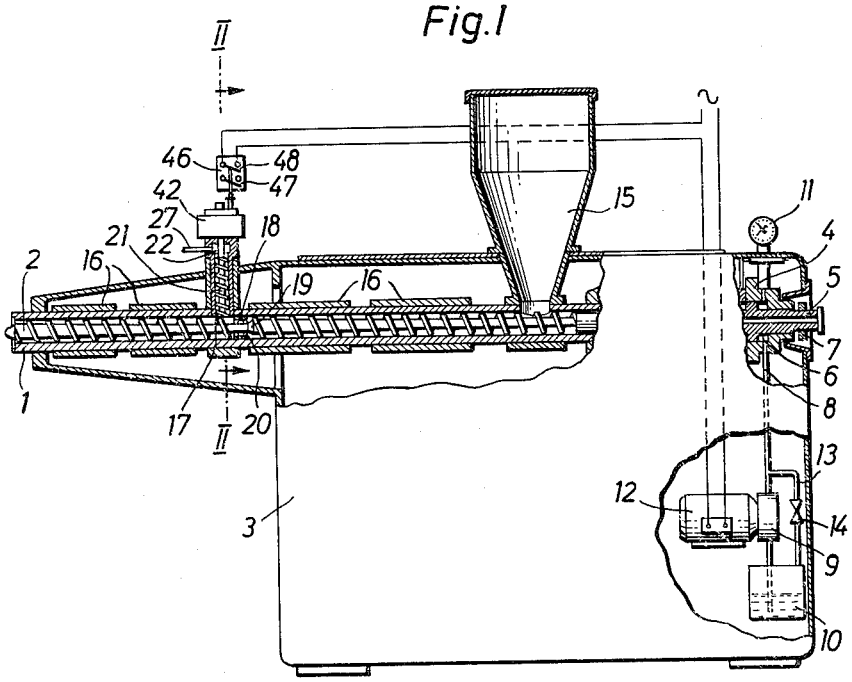

Oct. 19, 1965             H. HEIDRICH             3,212,133

SCREW EXTRUDER FOR PLASTICIZED MATERIALS

Filed July 9, 1963             2 Sheets-Sheet 1

INVENTOR

Horst Heidrich

Oct. 19, 1965     H. HEIDRICH     3,212,133
SCREW EXTRUDER FOR PLASTICIZED MATERIALS
Filed July 9, 1963     2 Sheets-Sheet 2

INVENTOR
Horst Heidrich

United States Patent Office 3,212,133
Patented Oct. 19, 1965

3,212,133
SCREW EXTRUDER FOR PLASTICIZED MATERIALS
Horst Heidrich, Cologne-Deutz, Germany, assignor to Klöckner-Humboldt-Deutz Aktiengesellschaft, Cologne-Deutz, Germany, a German corporation
Filed July 9, 1963, Ser. No. 293,803
Claims priority, application Germany, July 10, 1962, K 47,191
8 Claims. (Cl. 18—12)

My invention relates to a screw extruder for plasticized materials, for example thermoplastic artificial substances, and more particularly with an extruder having an axially displaceable extruder feed screw in an extruder cylinder, at least one vent duct located in the extruder cylinder between an extruder nozzle and a feed hopper and an annular slot provided in front of the vent duct as seen in the direction of feed of the plastic material.

In screw extruders of this type small amounts of plasticized extrusion material often escape into the vent duct simultaneously with the gases that leave the plasticized material in the extruder cylinder, thereby blocking the duct so that degassing of the material is reduced and may be cut off completely.

It is accordingly an object of my invention to provide a screw extruder for plasticized materials which avoids the foregoing disadvantages of known extruders of this type.

Another object of my invention is to provide a screw extruder of this type in which gases that are contained in the plasticized material are permitted to escape to atmosphere under high pressure.

A further object of my invention is to provide a screw extruder of this type from which the gases contained in the plasticized material may be drawn off by suction or low pressure.

Still another object of my invention is to provide a screw extruder of this type with a vent duct unblocking mechanism that returns the escaping plasticized material to the extruder cylinder and that operates only when the material enters the vent duct.

An additional object of my invenion is to provide a screw extruder of this type with means for automatically preventing the further flow of the material into the vent duct when the mechanism that unblocks the vent duct is set into operation.

To this end and in accordance with a feature of my invention, I provide a screw extruder with a screw conveyor in its vent duct which conveys back to the extruder cylinder any plasticized material which enters the vent duct while permitting suitable venting of the gases which leave the material in the extruder cylinder, the conveyor being mounted for axial displacement in the vent duct. The screw conveyor in the vent duct thus permits the gas contained in the plasticized material to escape to atmosphere under high pressure so that effective and substantially complete devolatilizing of the thermoplastic artificial material is possible.

According to another aspect of my invention, the vent duct has a lateral connecting tube which provides an outlet for the gas. The bearings for the screw conveyor in the vent duct are suitably located above the connecting tube and are gas-tightly cut off from the connecting tube and the vent duct. The gases that are contained in the artificial plasticized material can then be drawn out of the material with the help of a low pressure or suction source while preventing air from flowing through the bearing housings into the vent duct so as to reduce or destroy the vacuum therein. A contact switch is also provided in the circuit of the screw conveyor drive motor so that the circuit can be closed by the screw conveyor which is axially displaced by the material that enters the vent duct, and the screw conveyor can thereby be set into rotary operation. In this way the screw conveyor operates only when the working material enters the vent duct.

According to a further aspect of my invention, the extruder feed screw which is located in the extruder cylinder is connected for axial displacement with a hydraulic cylinder that is supplied by a pump, and in the circuit of the pump drive motor there is provided a switch contact which closes the circuit when the screw conveyor is displaced by plasticized material that has entered the vent duct. Thus, as the artificial plasticized material enters the vent duct and thereby places the screw conveyor therein in operation, there is a simultaneous displacement of the extruder feed screw in the forwardly moving direction of the material and the annular slot which is located upstream of the vent duct is reduced in size. In this way the mass of plasticized material which passes through the annular slot is decreased to such an extent that no additional material can escape into the vent duct.

Figure 2:
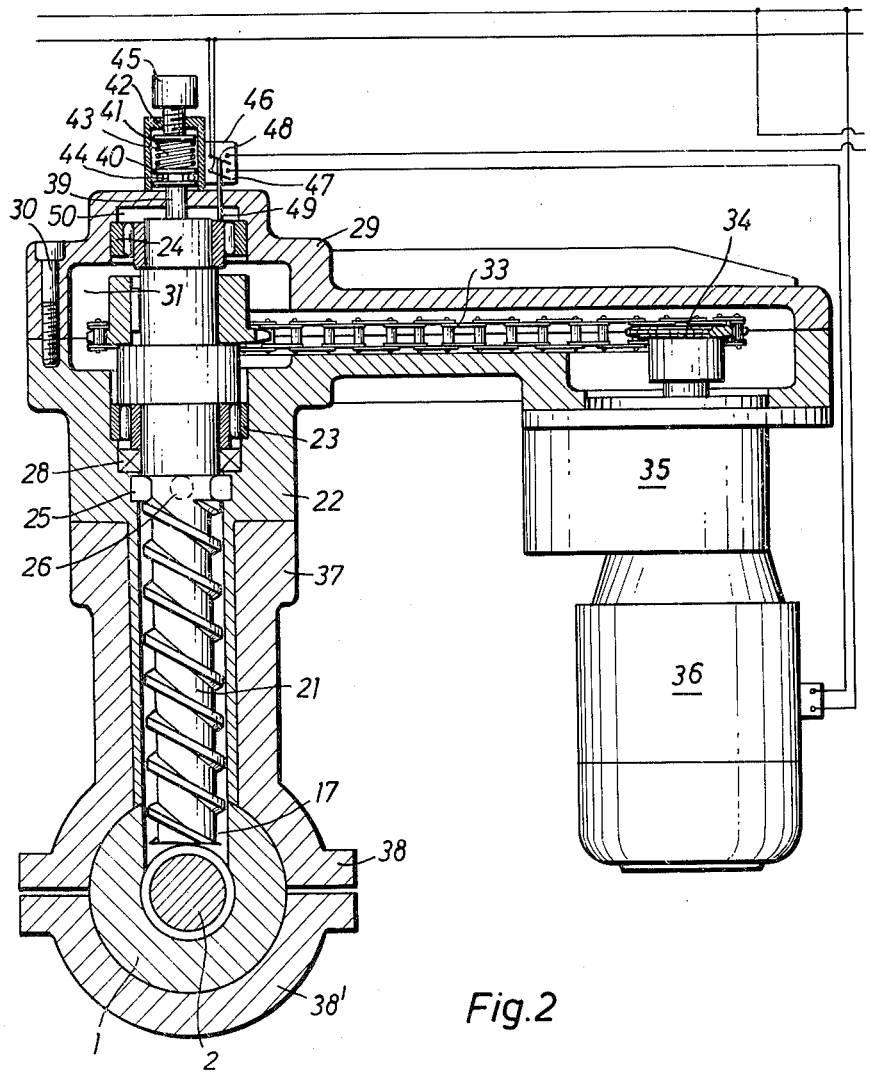

Other features which are considered as characteristic for the invention are set forth in the appended claims. The invention, however, both as to its construction and method of operation, together with additional objects and advantages thereof, will be best understood from the following description of specific embodiments when read in connection with the accompanying drawings, in which:

FIG. 1 is a side elevational view, partly in section and partly broken away, of the screw extruder constructed in accordance with my invention; and FIG. 2 is an enlarged sectional view taken along the lines II—II in FIG. 1 in the direction of the arrows.

Referring to the drawings, and particularly to FIG. 1, the screw extruder is shown as having an extruder barrel or cylinder 1 and an extruder feed screw or worm 2 located therein. The feed screw 2 is guided for axial displacement in the cylinder 1, and both the feed screw and the cylinder are enclosed by a housing 3. The free driven end of the feed screw 2 is connected to a piston 4, which has a projection 5 that is guided for axial movement in a bore formed in a wall of a cylinder 6. On the piston projection 5 there is provided a stop 7 which is adjustable in the axial direction of the piston projection 5 and by means of which the stroke of the piston 4 and therewith the axial displacement of the feed screw 2 in the extruder cylinder 1 can be regulated when necessary. A tube 8 communicates with the cylinder 6, and by means of a pump 9 which is driven by an electric motor 12, hydraulic fluid is forced from a container 10 through the tube 8 into the cylinder 6. Between the pump 9 and the cylinder 6, a tube 13 with a valve 14 is connected to the tube 8. The tube 13 which connects with the container 10 permits return flow of the liquid from the cylinder 6 to the container 10. A suitably connected manometer 11 indicates the pressure in the cylinder 6.

In the extruder cylinder 1 there is provided a supply slot or hopper 15 for the plasticized material that is to be processed, for example an artificial thermoplastic substance. The extruder cylinder 1 is surrounded by cylindrical heating elements 16 and is provided with a vent duct 17 (FIG. 2) communicating with the interior of the extruder cylinder through a port formed in its wall and located between the hopper 15 and the forward end of the feed screw 2 for exhausing the gas which comes out of the artificial plasticized material.

As viewed in the direction of the material flow through the extruder cylinder 1, there is located a cylinder ring 18 formed with bevelled faces (FIG. 1) in the cylinder 1 in front of the vent duct 17. The feed screw 2 is provided with a graduated portion 19 which forms an annular slot with the cylinder ring 18 whose size is adjustable by axial displacement of the feed screw 2.

In the vent duct 17, as shown in FIG. 2, there is provided a screw conveyor 21 which returns to the extruder cylinder 1 the plasticized material that enters the vent duct 17 and at the same time permits the gases which leave the plasticized material in the cylinder 1 to pass through the duct to the outside. The screw conveyor 21 is supported above the vent duct 17 in bearings 23, 24 in a housing 22 so that it is axially displaceable. Needle bearings are advantageously employed for this purpose. The vent duct 17 is widened in the housing 22 to form an annular space 25 to which a lateral opening 26 in the housing 22 and a connecting tube 27 (FIG. 1) for exhausting the gas is connected. The bearings 23, 24 are gas-tightly sealed off from the connecting tube 27 and the ventilating channel by means of an annular gasket or washer 28, which is located between the annular space 25 and the bearing 23. The advantage resulting from this construction is that the gas leaving the artificial plasticized material can also be exhausted from the extruder cylinder 1 by applying low pressure or suction to the connecting tube 27, without having air leak through the housing 22 into the vent duct 17 which would tend to destroy the vacuum therein. The housing 22 is closed with a cover 29 which is secured to the housing by screws 30.

Between the housing 22 and the cover 29 there is provided a free intermediate chamber 31 for receiving a driving mechanism. The driving mechanism includes a toothed wheel 32 secured to the screw conveyor 21, a drive chain 33 and a pinion 34 operatively connected to an electric motor 36 through a suitable transmission 35. The housing 22 is closely connected to a lower housing portion 37 which is formed with a lower semicircular cylindrical portion 38 that is secured by screws or the like (not shown) to a corresponding opposed semicircular cylindrical portion 38' located in the lower part of the extruder cylinder 1.

The screw conveyor 21 is provided at its upper end with a relatively narrow stub shaft 39 which extends through the housing cover 29. The stub shaft 39 is stressed by a compression spring 43 which is located between spring plates 40, 41 and disposed within a housing 42. Between the spring plates 40 and the stub shaft 39, a rotary bearing 44 is provided. This structure thus provides assurance that the screw conveyor 21 can rotate freely with respect to the spring 43, which remains stationary during the extrusion operation. The pressure exerted by the compression spring 43 can be varied by a rotatable device that is adjustable by hand, for example by means of a screw 45 which exerts pressure on the spring plate 41 and which extends into the housing 42.

A contact switch 46 is attached to the housing 42 and is provided with end switch arms 47, 48. Both end switch arms are secured to a rod 49 which extends axially displaceably through the bearing cover 29 and lies freely on the inner bearing ring 24.

The screw conveyor 21 is shown in its lowest position in FIG. 2. Axial displacement of the screw conveyor is, therefore, only possible in an upward direction from that position and in fact over a distance corresponding to the axial dimension of the free space 50 that is located above the bearing 24 between the inner bearing ring and the housing cover 29. In the illustrated position of the screw conveyor 21, the end switch arms 47, 48, which are connected to an energizing source, are open. When artificial plasticized material leaves the extruder cylinder 1 and enters the vent duct 17 during the extrusion process, the screw conveyor 21 is consequently forced upwardly due to the changed pressure of the material in the extruder cylinder 1. The rod 49 is also simultaneously shifted therewith in an upward direction and a circuit is closed by the end switch arm 47. The drive motor 36 is thereby energized and the screw conveyor 21 is set into operation. The screw conveyor 21 forces the material that has entered the ventilating channel 17 back again into the extruder cylinder 1. The end switch arm 48 is closed at the same time as the end switch arm 47 is closed and switches on the circuit of the motor 12 (FIG. 1) to which the pump 9 is connected. When the switch 48 is closed, the motor 12 and the pump 9 therewith are set into rotary motion. By means of this pump 9, hydraulic fluid is pumped from the container 10 into the cylinder 6 whereby the piston 4 and the feed screw 2 therewith are shifted in the forward feeding direction of the feed screw 2. The annular slot 20, which is located upstream or in front of the vent duct 17, is thereby reduced in size. The compressed plasticized artificial material accordingly flows in a thin layer through the annular slot 20. After the artificial material leaves the annular slot 20, it enters a low pressure or vacuum zone in which it is suddenly stress-relieved. The devolatilizing operation is assisted by the increased pressure build-up in front of the annular slot and the sudden release of stress behind the annular slot.

Due to the simultaneous operation of the screw conveyor 21 in the vent duct 17 and the feed screw 2 in the extruder cylinder 1, not only is further penetration of the artificial material into the vent duct thereby advantageously eliminated but also congestion in the extruder cylinder 2 which prevents the gas from leaving the artificial material is avoided.

As long as the quantity of material in the region of the vent duct 17 is reduced to such an extent that no plasticized material can move from the extruder cylinder 1 into the vent duct, the screw conveyor 21 is forced back by the pressure of the compression spring 43 into the initial position shown in FIG. 1. The end switch arms 47 and 48 are thus opened, the circuit to the motor 36 is broken and the screw conveyor 21 is inactivated. The circuit to the motor 12 is simultaneously broken, the pressure piston 4 is released of its load and the extruder feed screw 2 is forced back in reaction to the advancement of the plasticized material by the feed screw 2 into the illustrated position thereof.

It may be desirable to locate the vent duct 17 under rather than above the press cylinder 1, as shown in FIG. 1, when plasticized material that is particularly moisture-retentive is employed, so that the condensation products which form after the vapors are cooled can be exhausted from the vent duct 17.

In the case of screw extruders having several feed screws arranged near one another, each of the extruder cylinders in turn are provided with a vent duct.

A single extruder cylinder can also be provided with several vent ducts when such construction is considered desirable.

While my invention has been illustrated as a helically fed extrusion press for plastic materials, it is not intended to be limited to the details shown, since various modifications and structural changes may be made without departing in any way from the spirit of the present invention. Such adaptations should and are intended to be comprehended within the meaning and range of equivalents of the following claims.

I claim:

1. A screw extruder for plasticized materials such as thermoplastic artificial substances, comprising an extruder cylinder; a supply hopper communicating with the interior of said cylinder for supplying plasticizable material thereto; an extruder nozzle at one end of said cylinder and spaced from said supply hopper; a feed screw rotatably mounted in said cylinder for advancing the material from said hopper to said nozzle; a duct for venting volatile substances released from the material, said duct communicating with said cylinder intermediate to and spaced from said hopper and said nozzle; a screw conveyor mounted in said duct for returning to said cylinder material escaping therefrom with the released volatile substances and which tends to block the volatile substances from venting through said duct, said screw conveyor being axially displaceable by the material entering said duct; and means for rotating said screw conveyor in response to the axial displacement of said screw conveyor.

2. A screw extruder for plasticized materials such as thermoplastic artificial substances, comprising an extruder cylinder; a supply hopper communicating with the interior of said cylinder for supplying plasticizable material thereto; an extruder nozzle at one end of said cylinder and spaced from said supply hopper; a feed screw rotatably mounted in said cylinder for advancing the material from said hopper to said nozzle, restricting means located in said cylinder, said feed screw being axially displaceable and cooperable with said restricting means for restricting flow of the material through said cylinder; a duct for venting volatile substances released from the material, said duct communicating with said cylinder intermediate to and spaced from said hopper and said nozzle; a screw conveyor mounted in said duct for returning to said cylinder material escaping therefrom with the released volatile substances and which tends to block the volatile substances from venting through said duct, said screw conveyor being axially displaceable by the material entering said duct; and means for axially displacing said feed screw in response to the axial displacement of said screw conveyor.

3. A screw extruder for plasticized materials such as thermoplastic artificial substances, comprising an extruder cylinder; a supply hopper communicating with the interior of said cylinder for supplying plasticizable material thereto; an extruder nozzle at one end of said cylinder and spaced from said supply hopper; a feed screw rotatably mounted in said cylinder for advancing the material from said hopper to said nozzle, restricting means located in said cylinder, said feed screw being axially displaceable and cooperable with said restricting means for restricting flow of the material through said cylinder; a duct for venting volatile substances released from the material, said duct communicating with said cylinder intermediate to and spaced from said hopper and said nozzle; a screw conveyor mounted in said duct for returning to said cylinder material escaping therefrom with the released volatile substances and which tends to block the volatile substances from venting through said duct; means for yieldably biasing said screw conveyor toward said cylinder, said screw conveyor being axially displaceable against said yieldable biasing means by the material entering said duct; means for rotating said screw conveyor; and means for axially displacing said feed screw both in response to the axial displacement of said screw conveyor.

4. A screw extruder for plasticized materials such as thermoplastic artificial substances, comprising an extruder cylinder; a supply hopper communicating with the interior of said cylinder for supplying plasticizable material thereto; an extruder nozzle at one end of said cylinder and spaced from said supply hopper; a feed screw rotatably mounted in said cylinder for advancing the material from said hopper to said nozzle; a duct for venting volatile substances released from the material, said duct communicating with said cylinder intermediate to and spaced from said hopper and said nozzle; a screw conveyor mounted in said duct for returning to said cylinder material escaping therefrom with the released volatile substances and which tends to block the volatile substances from venting through said duct, said screw conveyor being axially displaceable by the material entering said duct; and circuit means including a drive motor for rotating said screw conveyor and a switch contact, said switch contact being actuated by axial displacement of said screw conveyor to close said circuit means and rotate said screw conveyor.

5. A screw extruder for plasticized materials according to claim 4, including biasing means for yieldably urging said screw conveyor toward said cylinder.

6. A screw extruder for plasticized materials according to claim 5, wherein said biasing means comprises a compression spring having one end operatively engaging said screw conveyor means and a manually adjustable screw operatively engaging the other end of said spring for varying the biasing force of said spring against said screw conveyor means.

7. A screw extruder for plasticized materials such as thermoplastic artificial substances, comprising an extruder cylinder; a supply hopper communicating with the interior of said cylinder for supplying plasticizable material thereto; an extruder nozzle at one end of said cylinder and spaced from said supply hopper; a feed screw rotatably mounted in said cylinder for advancing the material from said hopper to said nozzle; restricting means located in said cylinder, said feed screw being axially displaceable and cooperable with said restricting means for restricting flow of the material through said cylinder; a duct for venting volatile substances released from the material, said duct communicating with said cylinder intermediate to and spaced from said hopper and said nozzle; a screw conveyor mounted in said duct for returning to said cylinder material escaping therefrom with the released volatile substances and which tends to block the volatile substances from venting through said duct, said screw conveyor being axially displaceable by the material entering said duct; fluid pressure means for axially displacing said feed screw; and circuit means for energizing said fluid pressure means, said circuit means including a switch contact actuatable by axial displacement of said screw conveyor to close said circuit means and energize said fluid pressure means.

8. A screw extruder for plasticized materials in accordance with claim 7 wherein said fluid pressure means comprises a hydraulic cylinder operatively connected with said feed screw and pump means for pressurizing said hydraulic cylinder.

References Cited by the Examiner
UNITED STATES PATENTS

| | | | |
|---|---|---|---|
| 2,427,960 | 9/47 | Griffiths | 18—12 |
| 2,933,175 | 4/60 | Gray | 18—12 X |
| 2,970,341 | 2/61 | Mallory et al. | 18—12 |
| 3,001,233 | 9/61 | Ernst | 18—12 X |
| 3,008,184 | 11/61 | Fritsch | 18—12 |
| 3,029,471 | 4/62 | Adams et al. | 18—12 X |

FOREIGN PATENTS 915,689    7/54    Germany.

J. SPENCER OVERHOLSER, *Primary Examiner.*

MICHAEL V. BRINDISI, *Examiner.*